United States Patent [19]
Civanlar et al.

[11] Patent Number: 5,995,606
[45] Date of Patent: Nov. 30, 1999

[54] CLIENT-SERVER ARCHITECTURE USING INTERNET AND PUBLIC SWITCHED NETWORKS

[75] Inventors: Mehmet Reha Civanlar, Middletown; Barin Geoffry Haskell, Tinton Falls, both of N.J.

[73] Assignee: AT&T Corp., New York, N.Y.

[21] Appl. No.: 08/895,712

[22] Filed: Jul. 17, 1997

Related U.S. Application Data

[63] Continuation of application No. 08/747,576, Nov. 7, 1996, abandoned, which is a continuation of application No. 08/402,664, Mar. 13, 1995, abandoned.

[51] Int. Cl.$^6$ ............................................. H04M 3/42
[52] U.S. Cl. .................................... 379/201; 370/352
[58] Field of Search ........................ 379/67, 88, 89, 379/201, 265, 266, 309, 93.01, 93.24, 100.08, 100.12; 370/352

[56] References Cited

U.S. PATENT DOCUMENTS

| | | | |
|---|---|---|---|
| 4,941,170 | 7/1990 | Herbst | 379/100.07 |
| 5,029,200 | 7/1991 | Haas et al. | 379/201 |
| 5,181,236 | 1/1993 | LaVallee et al. | 379/266 |
| 5,333,266 | 7/1994 | Boaz et al. | 379/94 |
| 5,448,626 | 9/1995 | Kajiya et al. | 379/93 |

OTHER PUBLICATIONS

"The Voice of technology", Credit World, Jul. 1994, vol. 82, No. 6, pp. 20–23, by Kuehn, Richard A.
"Telecommunications buyers guide & directory", Editor & Publisher Feb. 12, 1994, vol. 127, No. 7, pp. 29TC–38TC.
"Interactive Marketing News," New Products ADD Interactive Voice–Response to WEB Sites. (Mar. 15, 1996) vol. 3, No. 6.
Multi Call: Web Call—a Real Virtual Call Center! M2 Presswire, Nov. 27, 1995.
"Internet Access: AT&T & SPANLINK Communications To Provide Telephone links From the Internet For Secure Electronic Commerce" Edge (Dec. 11, 1995).

*Primary Examiner*—Scott Wolinsky

[57] ABSTRACT

A client-server network enables interconnection to both the Internet and switched network. In response to a received client service request, a connection is established over the Internet between a client and a server. Client information transmitted from the client to the server over the Internet connection is used to enable the server to provide the requested service by establishing a switched network connection to the client using a client's communication number determined from the client information.

36 Claims, 10 Drawing Sheets

CLIENT-SERVER ARCHITECTURE USING INTERNET AND PUBLIC SWITCHED NETWORKS

This application is a continuation of application Ser. No. 08/747,576 filed on Nov. 7, 1996, which is a Continuation of application Ser. No. 08/402,664 filed on Mar. 13, 1995 (both are now abandoned).

TECHNICAL FIELD

This invention relates to the Internet network and, more particularly, provides a client-server architecture utilizing the Internet and public switched networks.

BACKGROUND OF THE INVENTION

The Internet's global and exponential growth is common knowledge today. The Internet is implemented using a large variety of connections between millions of computers. The recent developments on information navigation software and user interfaces, such as Mosaic of the World Wide Web, coupled with a continuously growing number of public access providers are making the Internet a fundamental component of the information age, if not the information super highway itself.

On the other hand, it is also well known that the current Internet lacks the 1) guaranteed quality of service (QOS), 2) security, and 3) an easy and flexible mechanism to charge for the information and transmission services which are all expected from a complete information network.

The existing telephone networks, on the other hand, have been offering these capabilities for a long time. In the future, Internet may also evolve to provide these functionalities. However, this requires fundamental changes in the global data communications infrastructure, e.g., Asynchronous Transfer Mode (ATM,) and this is not expected to happen for many years to come. What is desired is a practical way to provide guaranteed quality of service, security, and a charge mechanism for handling service requests made over the Internet.

SUMMARY OF THE INVENTION

In accordance with the present invention, a method of operating a client-server network enables the establishing of a connection over the Internet between a client and a server in response to a received client service request. Thereafter, client information transmitted from the client to the server over the established Internet connection enables the server to provide the client service request and to establish a switched network connection to the client using a client's communication number determined from the client information. The client information may include a client account number, login and password, and/or phone number to enable the server to establish the switched network connection to the client. In one embodiment, the client and server apparatuses each include a first interface for interfacing to the Internet and a second interface for interfacing to the switched network, both interfaces operable under control of a controller.

DETAILED DESCRIPTION

In the following description, elements of each figure have reference designations associated therewith, the most significant digit of which refers to the figure in which that element is first referenced and described (e.g., 100 is first referenced in FIG. 1).

The present invention provides a seamlessly integrated system that makes it possible to use an information transmission network, such as the Internet, which lacks 1) guaranteed quality of service, 2) security and 3) an easy and flexible mechanism to charge for the information and transmission services to be used together with a public switched network (e.g., PSTN, ISDN, ATM, etc. type networks) that does offer these functionalities. While the remainder of this specification will be described with the assumption that the switched network is a Public Switched Telephone Network (PSTN), and thus, the communication number is typically a telephone number, it should be noted that the switched network may also be a private or corporate communication or data network as long as it provides the three functionalities. Thus, in more general terms, the communication number is used to direct communication to a client on any such network.

The Internet is a dynamic network consisting of millions of interconnected computers which could run several applications, such as the World Wide Web. Mosaic of the World Wide Web provides a window-based program that provides a user easy access to various services over the Internet. The present invention enables the above-identified functionality of the public switched network to be combined with the Internet functionality to enhance services provided by existing Internet applications and to create new ones.

Figure 1:
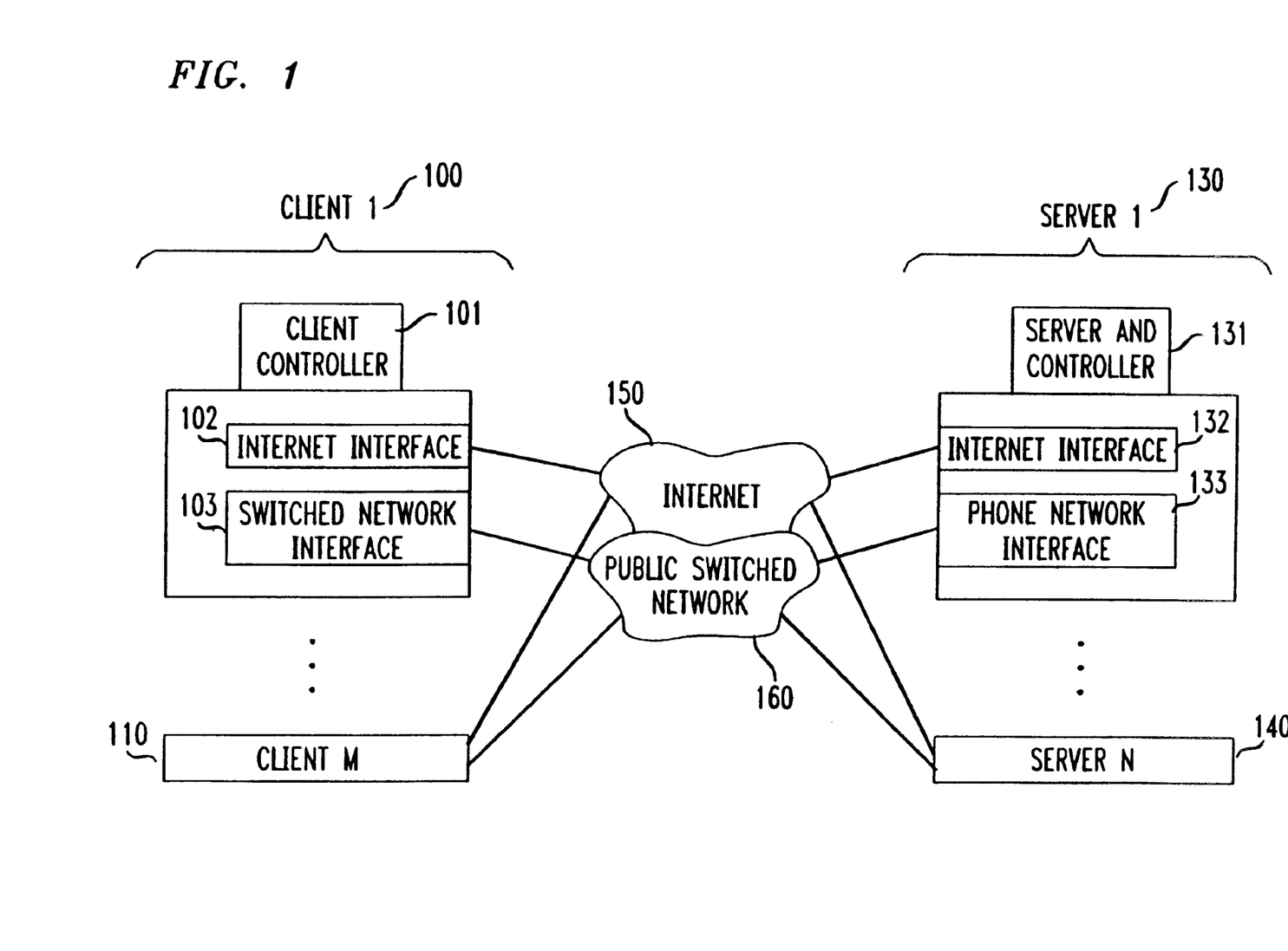
FIG. 1 shows an illustrative client-server architecture which uses both the Internet and the public switched network in accordance with the present invention.
Figure 8:
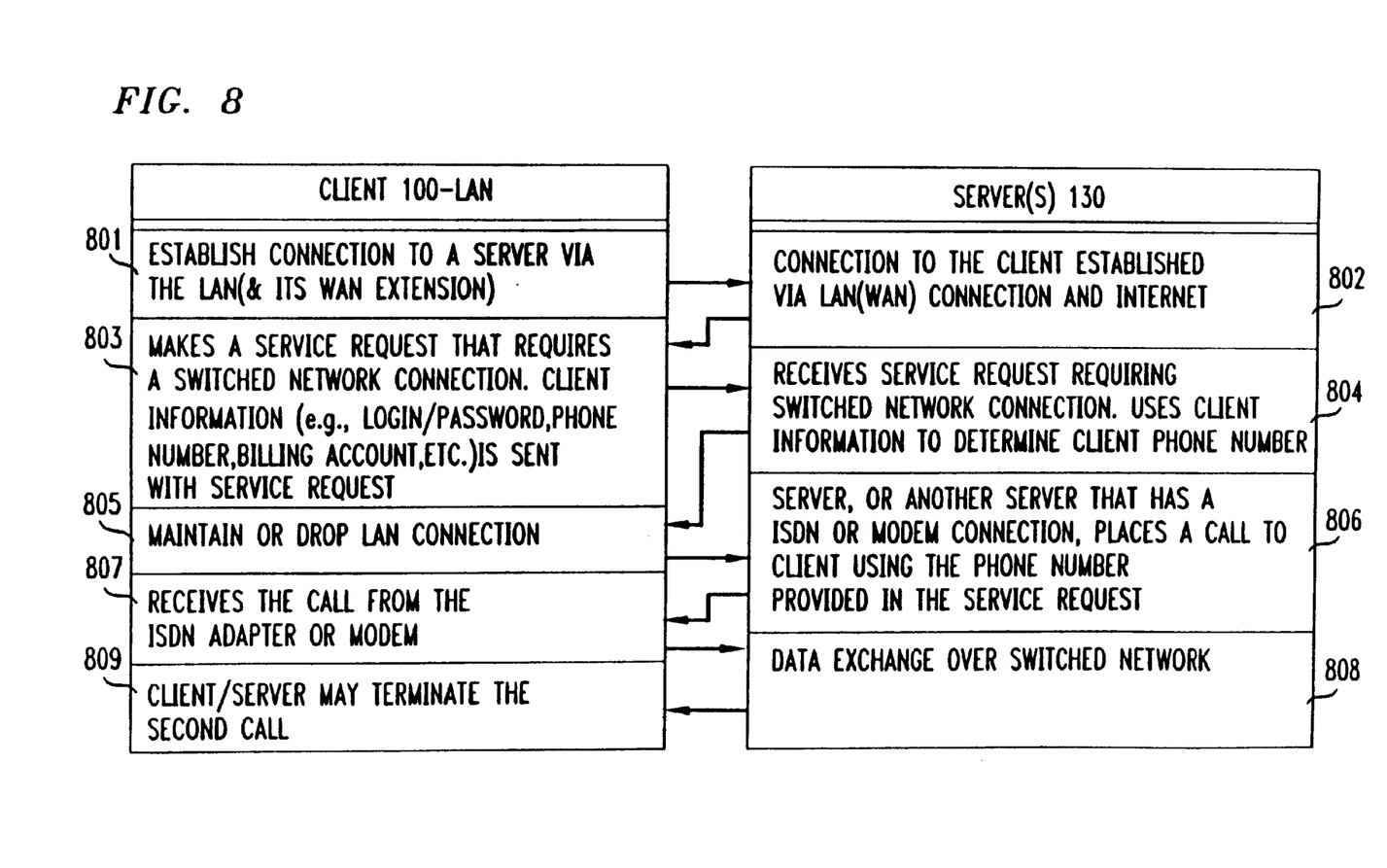
FIG. 8 is a flowchart describing the process of handling a typical client request using the client-server architecture of FIG. 7.

With reference to FIG. 1, the system is based on a client-server architecture, where the client apparatus, e.g., 100, may be either a personal computer (PC) or a workstation. Each client 100, 110 requires two logical network connections or interfaces, e.g., 102 and 103. One of these interfaces 102 provides a connection to the Internet 150 which can be made through a local area network (LAN) (as shown in FIGS. 6 and 8) or through a Serial Line Internet Protocol (SLIP) connection over a modem (as shown in FIG.

Figure 5:
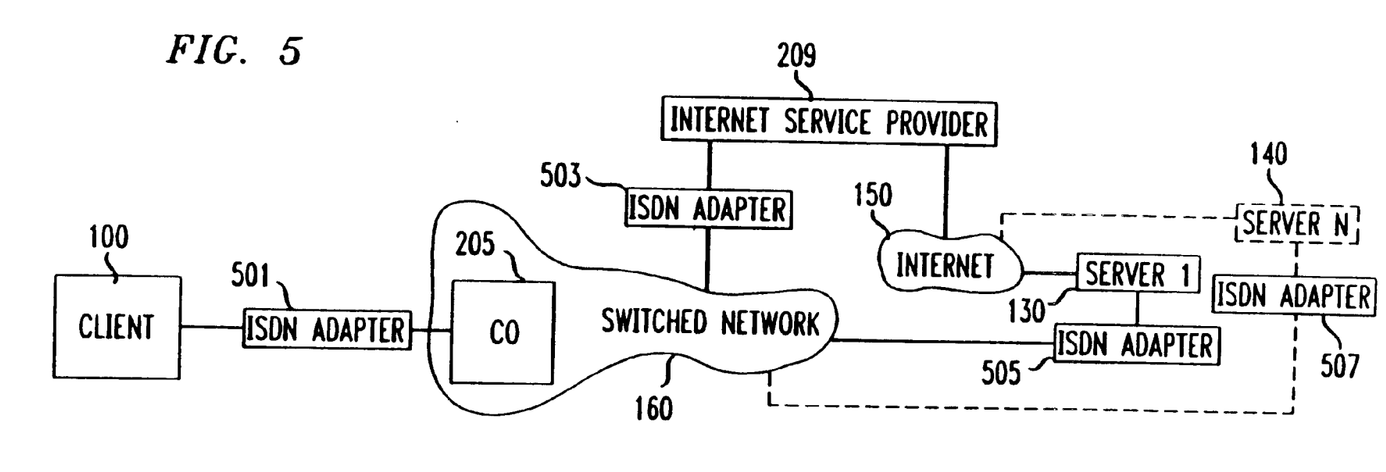
FIG. 5 shows the client-server architecture utilizing an Integrated Services Digital Network (ISDN) adapter port to interface to the Internet and public switched network.
Figure 6:
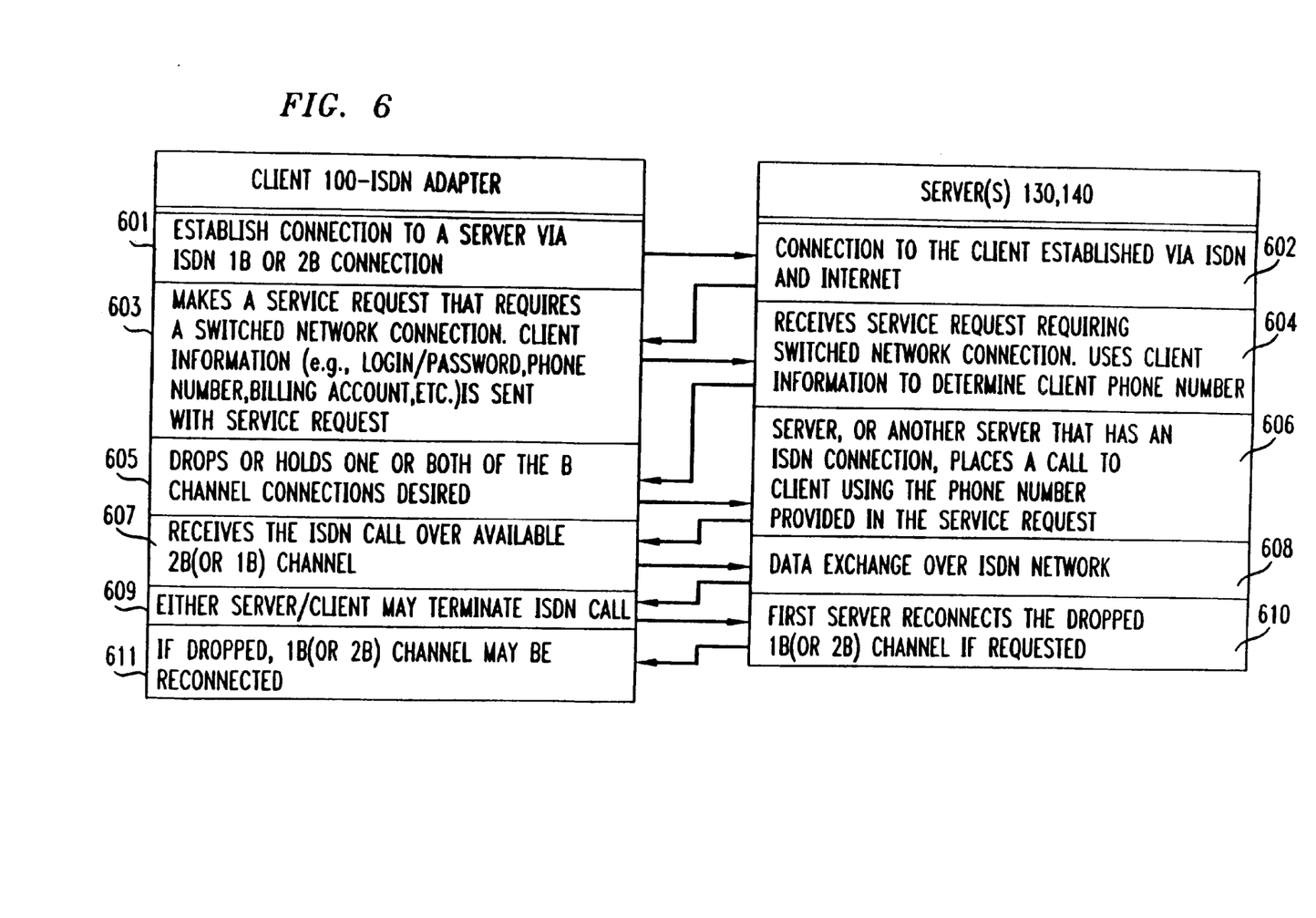
FIG. 6 is a flowchart describing the process of handling a typical client request using the client-server architecture of FIG. 5.

2) or over an ISDN port (as shown in FIG. 5). These connections can be made either through a private connection or through a public switched telephone network (PSTN). The second interface 103 provides a connection to a public or private switched telephone network, which may also be made through a modem (shown in FIG. 2), an ISDN port (shown in FIG. 5), or via a connection to a special LAN such as an ATM LAN or a LAN that offers bandwidth reservation (shown in FIGS. 6 and 8). It should be noted that these two interface connections 102 and 103 are defined at the logical level, that is, client apparatus 100 may have a single physical connection (i.e., modem, ISDN adapter, etc.) that can be used to attach it to both the Internet 150 and public switched network 160 (various embodments are shown in FIGS. 2, 5, 7 and 9). Similarly, a server 130, typically a computer, has access to both Internet 150 and public switched network 160 via logical network interfaces 132 and 133. Generally, the system of FIG. 1 enables a plurality of client computer-based apparatuses 100-110 to access a plurality of servers 130–140 via Internet 150 and public switched network 160.

The present invention is used when a user at a client apparatus 100 connects to a server 130 through Internet 150 and requests an application or service that requires enhanced functionalities not available on Internet 150, but offered by the public switched network 160. Illustratively, such an enhanced service request would be one requesting a guaranteed QOS delivery, security, or customized charging. Illustratively, such enhanced Internet services would enable the delivery over the switched network of 1) real-time video transmission, 2) real-time, high-quality audio transmission, and 3) immediate access to sensitive data, e.g., stock market data.

For such service requests, the server 130 may initiate a call connection over the public switched network 160, using a telephone number provided by the client apparatus 100 as part of the service request, and deliver information for the requested service. This call may be billed by any of the standard call billing methods, e.g., collect or third part billing, etc. For such an application or service, the public switched network 160 provides the billing for the service and transmission as provided in a normal call made over the public switched network 160. The connection over the public switched network provides enhanced security, and complicated identification mechanisms are not needed. In a typical application or service request between a client and a server, both the Internet and public switched network connection may coexist. Another possibility is to use an already established client account for billing purposes.

A general overview of the operation of the present invention is as follows. When a Hyper Text Transport Protocol (HTTP) server receives a request for an application or service which requires a phone connection, it activates a new process which handles calling the phone number associated with this request. This process can run on the same controller that is running the HTTP server, or it can be run on another machine connected to the first one through some connection, e.g., through a LAN. Several programs for automatic dialing of PSTN or ISDN numbers are available for various computers (e.g., AT&T Vistium) and can be used for this purpose. Client apparatus 100 includes a program that accepts incoming phone calls. Such software is also available from many vendors (e.g., AT&T's Vistium). The actual transaction, e.g., security checks and sending a file or audio/video data over the phone connection, can then be handled by the same process or yet another process. At the end of the transaction, the phone connection is dropped.

Figure 2:
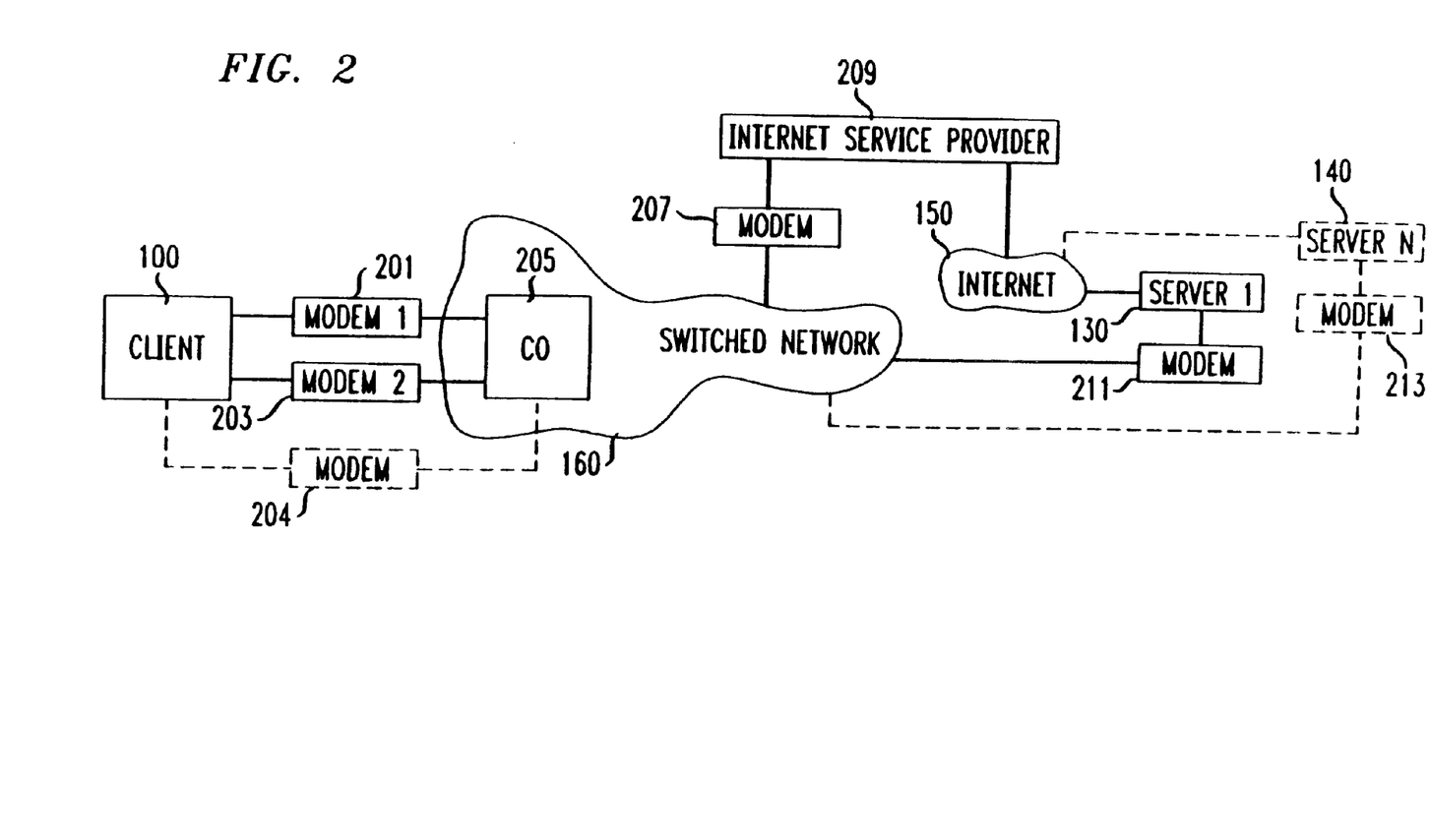
FIG. 2 shows specific embodiments of the client-server architecture of FIG. 1 utilizing different modem arrangements to interface to the Internet and public switched network.

With reference to FIG. 2, we discuss a client-server architecture which utilizes a first modem 201 as the Internet interface 102 and a second modem 203 as the switched network interface 103. The first modem 201 and second modem 203 connect to central office 205 which provides access to the public switched network 160. The public switched network 160 connects to an Internet service provider 209 via modem 207. The Internet service provider 209 may be any of the well-known on-line service providers (e.g., Delphi).

Various on-line service providers (209 of FIG. 2), such as America Online, CompuServe, Delphi, etc., use PSTN with modems 207 or ISDN (503 of FIG. 5) for client connections. The servers used by these on-line service providers 209 are already on the Internet and they do have access to modem pools for their client's connections. It is possible to service client 100 on the servers used by these service providers when client 100 makes a service request. In this case, the server 130 establishes a phone connection with the service provider's (209) server which, in turn, forwards the call to the line of the client 100 who initiated the request. This could be accomplished, for example, using PBX functionalities or call forwarding features that exist on many on-line service provider systems.

Returning to our FIG. 2, Internet service provider 209 connects to servers 130 and 140 via Internet 150. The servers 130 and 140 utilize modems 211 and 213, respectively, to connect to public switched network 160. Alternatively, a single modem, shown as 204, may be used to provide both the Internet interface 102 and switched network interface 103 functions. The process of handling a user request using the single-modem arrangement is described in FIG. 4.

Figure 3:
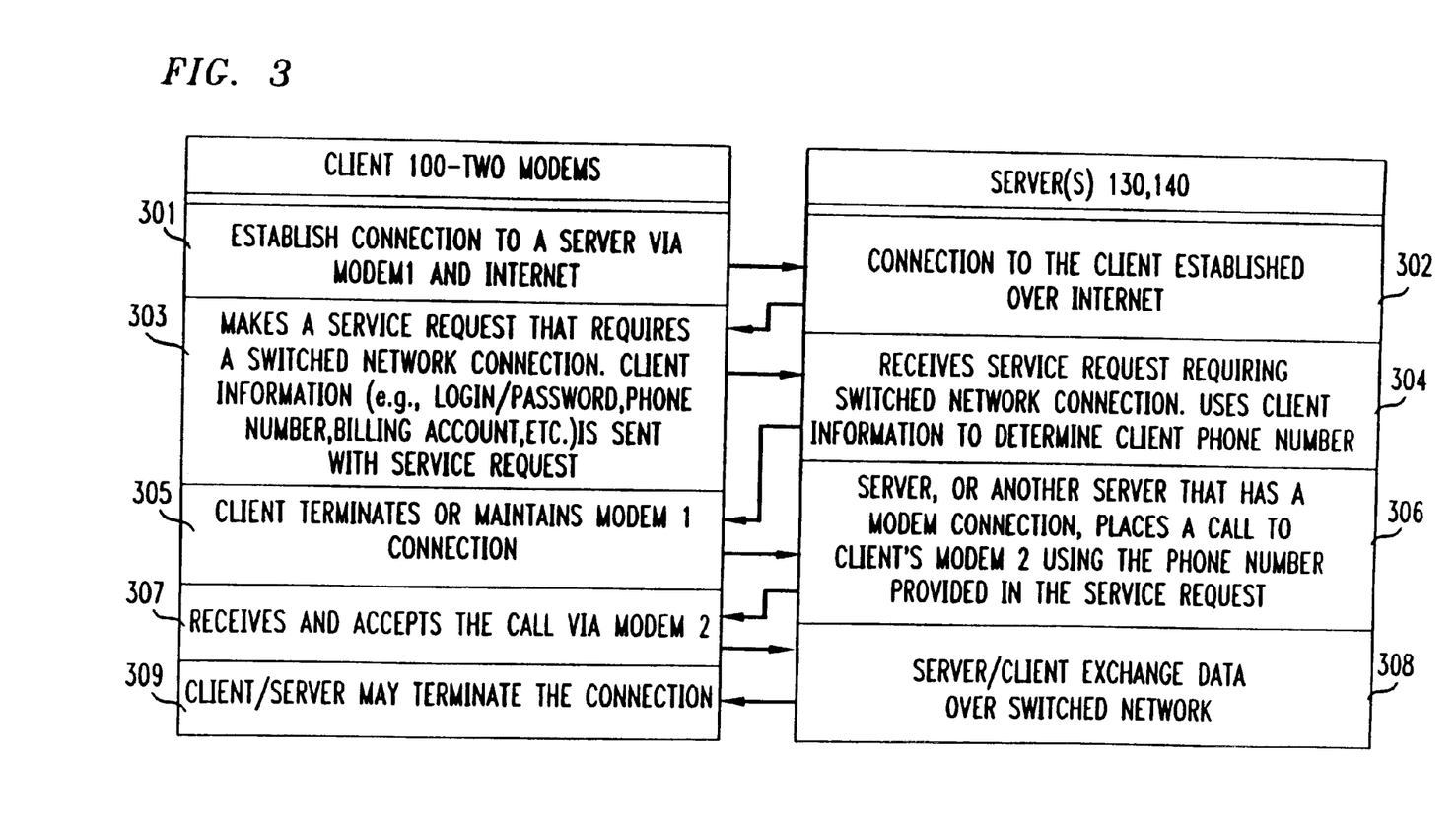
FIG. 3 is a flowchart showing the processing of a typical client request using the two-modem arrangement of the client-server architecture of FIG. 2.

With reference to FIG. 3, we describe a typical client access request to a server via the Internet utilizing the two-modem arrangement of FIG. 2. In step 301, in response to a user input, client apparatus 100 establishes a connection to a server 130 via modem 1 (201 in FIG. 2), CO 205, public switched network 160, modem 207, Internet service provider 209, and Internet 150. Typically, access by a client apparatus 100 to a server 130 via the Internet 150 utilizes the Hyper Text Transport Protocol (HTTP) which is accessed using a Mosaic application program available at the client apparatus 100.

The functionalities required by this invention can be implemented by simple additions to the Mosaic server. For example, a server (e.g., 130) can be implemented using the well-known Common Gateway Interface (CGI) for which public software implementations are available for HTTP (Mosaic) servers. The CGI is an open interface specification that can be obtained from the Internet and is encapsulated by reference herein. The CGI would be adapted to provide the functions described in the flowchart of FIGS. 3, 4, 6, 8 and 10.

In step 302, server 130 completes the connection to client 100 that was established over Internet 150. In step 303, a user at client apparatus 100 makes a service request that requires a service functionality that cannot be provided by Internet 150. One such service which may not be adequately provided by Internet 150 would be a request for delivery of a long video or audio segment. Such a long video or audio segment may not be possible to have a guaranteed real-time delivery because one or more of the switches or computer links in the Internet 150 may be busy handling other requests.

The service request in step 303 also includes client information (e.g., client ID, phone number, billing account) which is used by the server to process the service request. According to illustrative embodiments, each client may have a pre-established account in a database at a server location. The database entry for a given client account may include the client's login/password, phone number, billing account and other information deemed necessary to properly process service request and to deliver and bill for information delivery or other services provided by the server. For security reasons, this client account information may be encoded or encrypted. When a client enters a service request, the client's database entry corresponding the client account is accessed in a well-known manner to obtain the necessary information to properly process, deliver and bill for the service request. As an alternative to obtaining the client's phone number through a database look-up, the client can provide the necessary information or the server can request the specific information that it needs from the client to process the service request. This information would, illustratively, include the client's login/password, phone number and billing account information for billing for the phone call and services provided. For purposes of billing for telecommunications charges, the client may just ask the server to call the client "collect". The phone number in our example is that of modem 2 (203) to enable the server 130 to call back client apparatus 100. In step 304, server 130 receives the service request requiring a public switched network 160 connection. Server 130 uses the client-provided information to determine the phone number of the client (e.g., modem 2's phone number).

In step 305, client apparatus 100 may terminate or maintain the modem 1 connection to Internet 150. The modem 1 call is terminated when client apparatus 100 knows it has no other communications or service requests requiring Internet 150 access. If it does, then the connection to Internet 150 is maintained. In step 306, if server 130 has a modem connection 211, it can initiate the call to the public switched network 160. If server 130 does not have a modem, then another server 140 having a modem 213 may be used to establish the connection to public switched network 160 (server 140 uses the client phone number provided by server 130 to dial the client and acts as a conduit for information intended for the client). In any event, a call connection is initiated to modem 2 using the phone number provided in the service request. In step 307, client apparatus 100 receives, optionally checks the caller ID, and accepts the call (which may be collect) from the server 130 and establishes a connection through modem 2. Thereafter, in step 308, client apparatus 100 and server 130 can exchange data over the switched network 160. In step 309, either the client 100 or server 130 may terminate the phone call connection. If appropriate, server 130 would then bill the client's account for the call and the services provided. Alternatively, billing could be made entirely through switched network providers using standard billing techniques.

Figure 4:
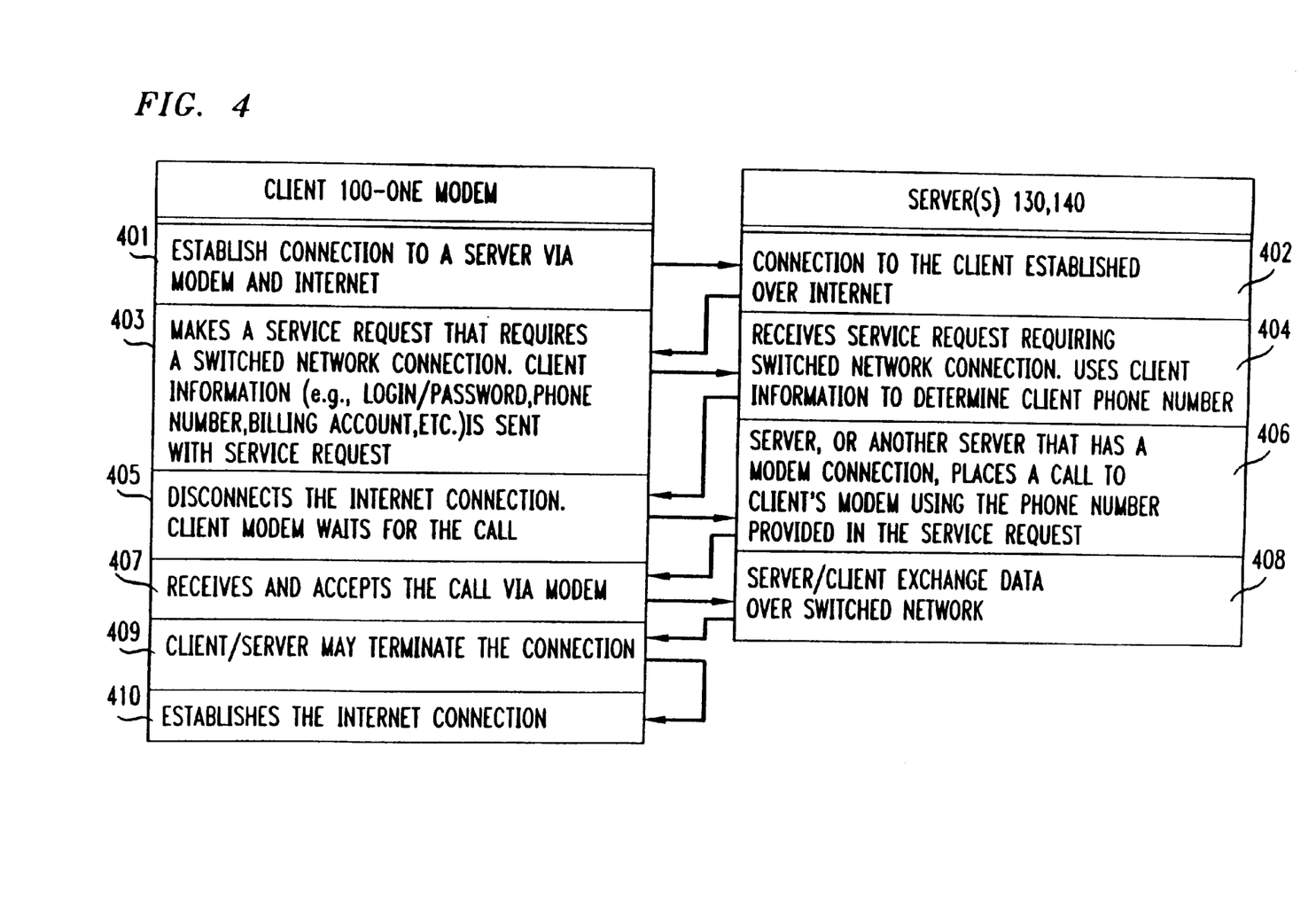
FIG. 4 is a flowchart showing the processing of a typical client request using a single-modem arrangement of the client-server architecture of FIG. 2.

With reference to FIG. 4, we describe an illustrative handling of a service request utilizing the single modem 204 of FIG. 2 to provide both the Internet interface 102 and switched network interface 103 functions. In step 401, in response to a user's service request, the client computer apparatus 100 establishes a connection to server 130 via modem 204, CO 205, switched network 160, modem 207, Internet service provider 209, and Internet 150. Again, this access to server 130 may utilize the Mosaic application program to access Internet 150. In step 402, server 130 completes the Internet 150 connection to apparatus 100. In step 403, it is assumed that the service request requires a functionality that cannot be provided over Internet 150. In such a situation, the user or apparatus 100 provides client information, illustratively including a phone number (scrambled to ensure security), to server 130 as part of the service request. In step 404, server 130 receives the client information including the phone number as part of the service request. In step 405, client apparatus 100 disconnects the Internet connection and modem 204 waits for the call from server 130. In step 406, server 130 itself or another server, e.g., 140, that has a modem connection to switched network 160 places a call to modem 204 at client apparatus 100 using the phone number provided in the original service request. In step 407, client apparatus 100 receives and accepts the call (which could be a collect call) and establishes a connection through modem 204. In step 408, server 130 and client apparatus 100 exchange data over the switched network 160. In step 409, either the client apparatus or server may terminate the switched network connection. In step 410, the Internet connection can be established.

With reference to FIG. 5, we describe a client-server architecture utilizing an ISDN adapter to interface both client apparatus 100 and server 130 to both public switched network 160 and Internet 150. The initial connection between client apparatus 100 and server 130 is made via ISDN adapter 501, CO 205, switched network 160, ISDN adapter 503, Internet service provider 209, and Internet 150. The subsequent connection from server 130 to apparatus 100 is made via ISDN adapter 505, the ISDN network portion of switched network 160, and ISDN adapter 501.

With reference to FIG. 6, we describe an illustrative processing of a client access request to server 130. In step 601, client apparatus 100 is connected to server 130 using either a 1B or 2B channel connection in the ISDN adapter. Again, the client uses the Mosaic application program to access Internet 150. As previously described, the connection extends from client apparatus 100 via ISDN adapter 501, the ISDN capability of switched network 160, ISDN adapter 503, Internet service provider 209, and Internet 150 to server 130. In step 602, server 130 completes the connection via the Internet 150. In step 603, client apparatus 100 makes a service request that requires a switched network 160 to enable server 130 to deliver the requested information. This service request includes client information, including, in our example, the phone number of the ISDN adapter 501. In step 604, server 130 receives the service request including the phone number needed to establish a connection via switched network 160.

In step 605, assuming that client apparatus 100 has utilized both of the B channels of ISDN adapter 501, then one of the B channel connections is dropped or put on hold. If, however, the client apparatus utilized one of the B channels for Internet 150, then the other B channel could be used for the switched network connection. In step 606, server 130 itself, or another server 140 that has an ISDN adapter, places a call to client apparatus 100 using the phone number provided in the service request. In step 607, client apparatus 100 receives the ISDN call over one or both of the B channels. In step 608, data exchange takes place between server 130 and client apparatus 100 over the ISDN portion of switched network 160. In step 609, either the client apparatus 100 or server 130 may terminate the ISDN call. In step 610, if the Internet connection was dropped, the client apparatus 100 and server 130 may reconnect the dropped B channel(s). If the Internet connection was held, client 100 simply resumes Internet communication in the normal way.

Figure 7:
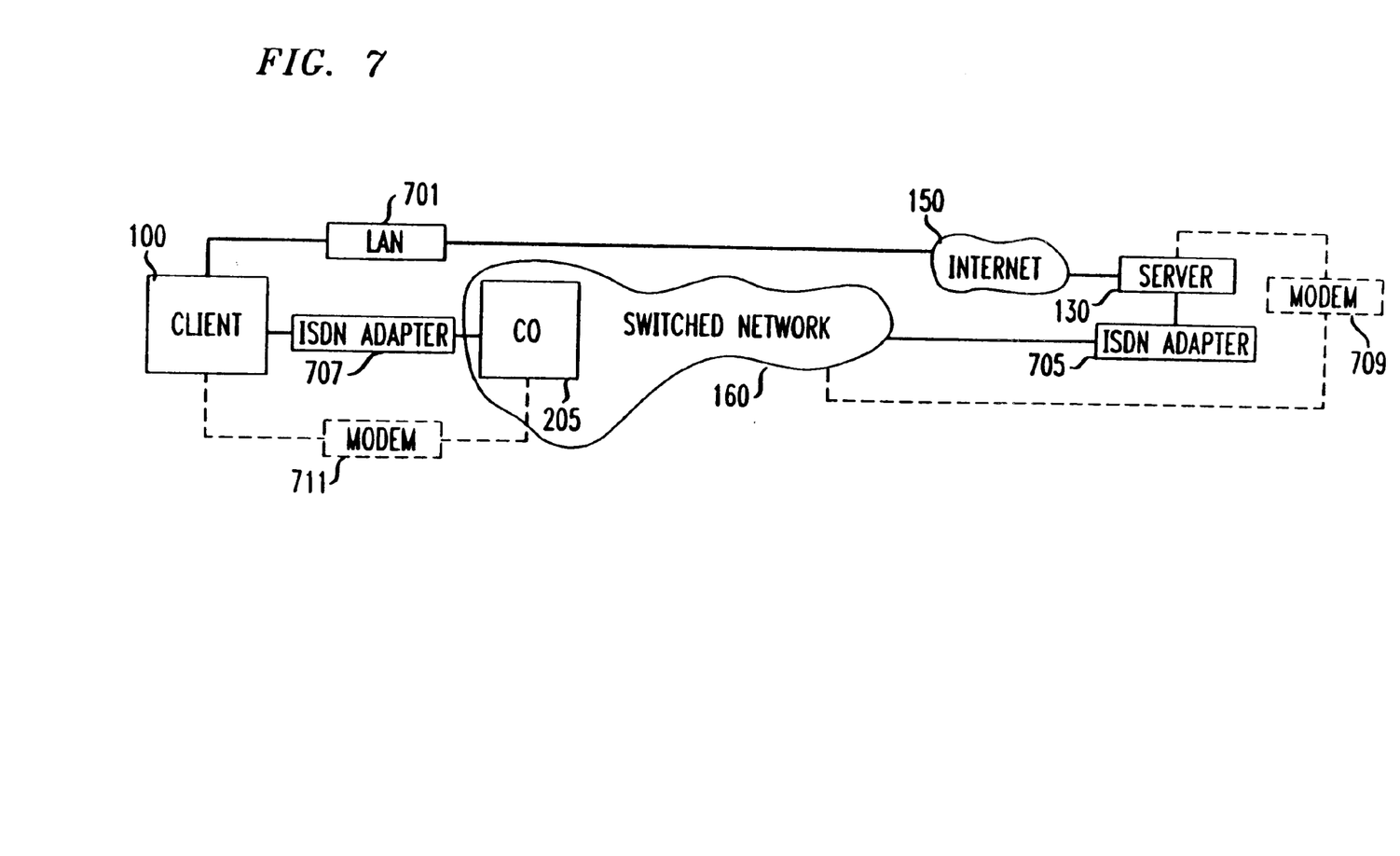
FIG. 7 shows the client-server architecture utilizing a Local Area Network (LAN) interface to the Internet.

With reference to FIG. 7, we discuss a client-server architecture utilizing a LAN interface to Internet 150. Client apparatus 100 establishes a service request connection to server 130 utilizing LAN 701 and Internet 150. If the service request requires a connection capability not provided by Internet 150, server 130 may establish a connection to client apparatus 100 via ISDN adapter 705, ISDN portion of the switched network 160, CO 205 and ISDN adapter 707. Alternatively, server 130 can connect to client apparatus 100 using modem 709, switched network 160, and modem 711.

With reference to FIG. 8, we describe an illustrative client access request utilizing the client-server architecture of FIG. 7. In step 801, client apparatus 100 establishes a connection to server 130 via LAN 701 (and its WAN extension). In step 802, server 130 is connected to client apparatus 100 via the LAN (WAN) connection and Internet 150. In step 803, client apparatus 100 makes a service request that requires a switched network 160 connection and provides client information including a phone number for modem 711 or ISDN adapter 607. In step 804, server 130 receives the service request and phone number. In step 805, client apparatus may terminate or maintain LAN 701 connection via Internet 150. In step 806, server 130 itself, or another server that has an ISDN or modem connection capability, places a call using the phone number provided in the service request. In step 807, client apparatus 100 receives the call from modem 711 or ISDN adapter 607 and establishes the connection. In step 808, the server 130 and client apparatus 100 exchange data over switched network 160. In step 809, either server 130 or client apparatus 100 may terminate the (that is, ISDN or modem) call.

Figure 9:
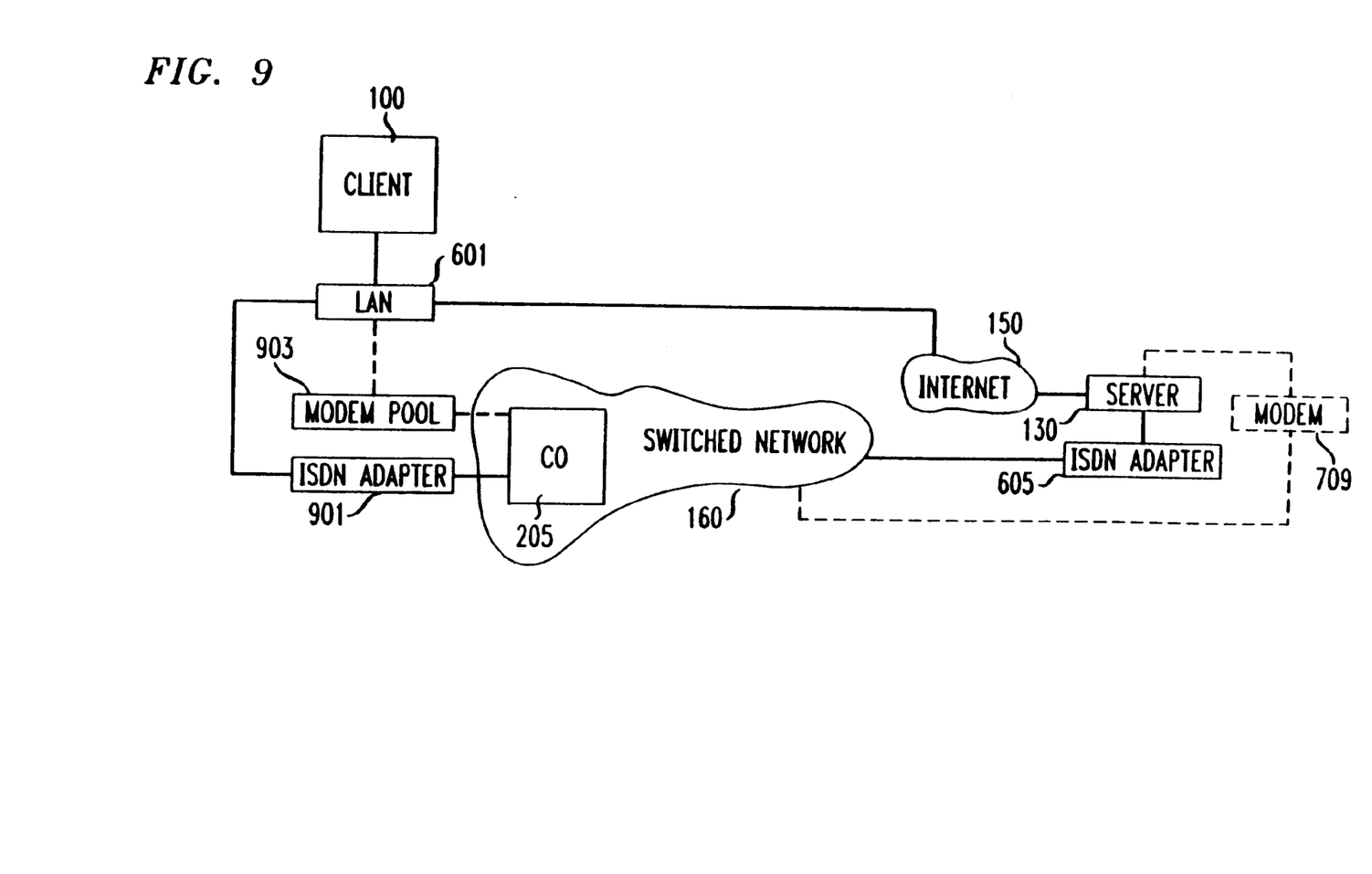
FIG. 9 shows the client-server architecture using a LAN interface to both the Internet and public switched network.

With reference to FIG. 9, we discuss a client-server architecture utilizing a LAN interconnection (perhaps with bandwidth reservation) to both Internet 150 10 and switched network 160. Bandwidth reservation is a well-known LAN connection protocol which is available from many vendors, such as Novell. A connection is established to client apparatus 100 and server 130 via LAN 601 and Internet 150. If necessary, a second connection can be established between server 130 and client apparatus 100 via ISDN adapter 605, switched network 160, CO 205, ISDN/LAN adaptor (or bridge) 901, and LAN 601. Alternatively, a second connection can be established between server 130 and client apparatus 100 via modem 709, switched network 160, CO 205, modem pool 903, and LAN 601.

Figure 10:
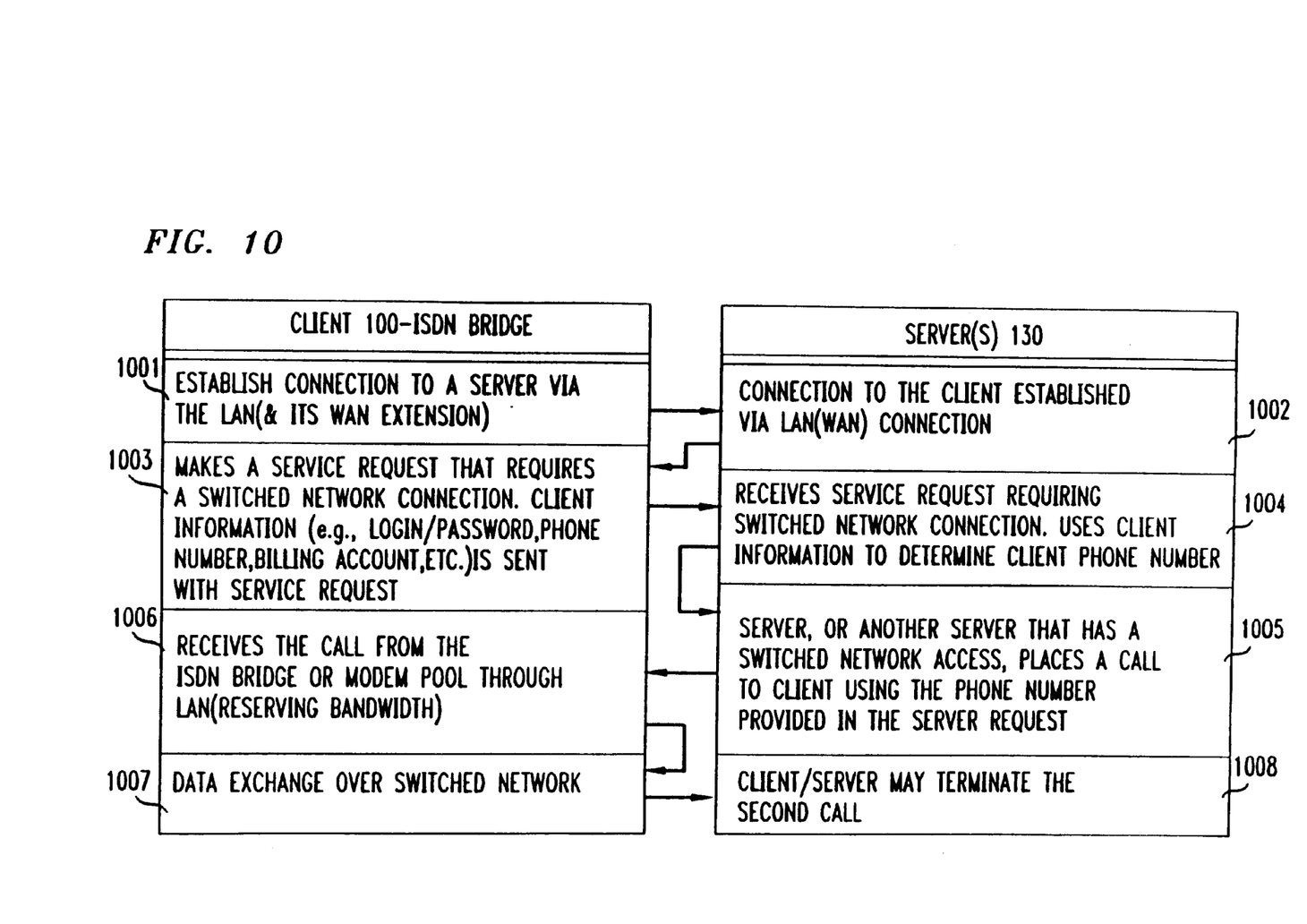
FIG. 10 is a flowchart describing the process of handling a typical client request using the client-server architecture of FIG. 9.

With reference to FIG. 10, we describe an illustrative client access request to server 130. In step 1001, client apparatus 100 connects to server 130 via LAN 601. In step 1002, server 130 connects to client apparatus 100. In step 1003, a client makes a service request that requires a switched network connection to handle the information transferred from server 130. The service request includes client information, illustratively a phone number for the modem pool 903 or ISDN/LAN bridge 901, which is to be utilized to complete the connection to the client apparatus 100. In step 1004, server 130 receives the service request and the phone number to be utilized to establish the second connection. In step 1005, server 130 places the second call via ISDN adapter 605, or modem 709, using the phone number provided in the service request. In step 1006, client apparatus 100 receives the call from the modem pool 903 or ISDN/LAN 901 through LAN 601 (perhaps using bandwidth reservation). In step 1007, server 130 and client apparatus 100 exchange data over switched network 160 utilizing either the modem or ISDN equipment. In step 1008, either server 130 or client apparatus 100 may terminate the (ISDN or modem) call.

What has been described is merely illustrative of the application of the principles of the present invention. Other arrangements and methods can be implemented by those skilled in the art without departing from the spirit and scope of the present invention.

The invention claimed is:

1. A method of communicating information to a client in a client-server network in response to a received client-service request, the method comprising the steps of
   receiving, at a server, client information by way of a connection over the client-server network to enable the server to respond to the client service request,
   establishing a connection over a switched network to the client using a client's communication number determined from the client information, and
   automatically sending information to the client by way of the switched network connection, wherein said automatically sent information at least partially fulfills the service request.

2. The method of claim 1 further comprising the step of terminating said client-server network connection after said receiving step.

3. The method of claim 1 wherein said received client information includes a login and password from which the server determines the client's communication number.

4. The method of claim 1 wherein said received client information includes a client account number from which the server determines the client's communication number for use in establishing the switched network connection.

5. The method of claim 1 wherein said received client information includes a switched network phone number of the client.

6. The method of claim 1 wherein the client is connected to the client-server network using an Integrated Services Digital Network (ISDN) adapter.

7. The method of claim 1 wherein the client is connected to the client-server network using a Local Area Network (LAN).

8. The method of claim 1 wherein the switched network connection to the client is a collect call.

9. A client apparatus for connecting to any of a plurality of server apparatuses over the Internet and a switched network, comprising
   first interface means for interfacing said client apparatus to said Internet,
   second interface means for interfacing said client apparatus to said switched network and for receiving information automatically sent to the client apparatus in accordance with a service request for information, the received information received by way of a connection over a switched network and at least partially fulfilling the service request, and
   controller means including
   means for establishing, in response to a client request, a first connection via the first interface and Internet to a client-selected first server apparatus,
   means for communicating information identifying a specific communication service identified by a request to establish a second connection to said client apparatus over said switched network, and
   means, responsive to a connection request received from the first server apparatus via said second interface and the switched network, for initiating the establishment of a second connection between the first server apparatus and the client apparatus, said second connection being used to enable the first server apparatus to provide the specific communication service requested by the client apparatus.

10. The client apparatus of claim 9 wherein the first connection is terminated after sending the client information.

11. The client apparatus of claim 9 wherein the first connection is maintained during a portion of the second connection.

12. The client apparatus of claim 9 wherein the first and second interface means use separate modems.

13. The client apparatus of claim 9 wherein the first and second interface means use a single modem for providing the first and second connections and wherein the first connection is terminated before the second connection is established.

14. The client apparatus of claim 9 wherein the first and second interface means are implemented using different communication channels of an Integrated Services Digital Network (ISDN) adapter.

15. The client apparatus of claim 9 wherein the first and second interface means are implemented using a Local Area Network(LAN) having a Public Switched Telephone Network(PSTN) connection.

16. The client apparatus of claim 9 wherein the client information is used by the first server apparatus to identify a phone number of the second interface of the client apparatus.

17. A server apparatus for connecting to any of a plurality of client apparatuses over the Internet and a switched network, comprising
first interface means for interfacing said server apparatus to said Internet,
second interface means for interfacing said server apparatus to said switched network, and
controller means including
means, responsive to information identifying a specific communication service identified by a client service request and client information, for enabling the server apparatus to establish a new connection to the first client apparatus over said switched network and for automatically sending information to the first client apparatus by way of the switched network connection, wherein said automatically sent information at least partially fulfills the service request.

18. The server apparatus of claim 17 wherein the second interface means is a modem.

19. The server apparatus of claim 17 wherein the second interface means is an Integrated Services Digital Network (ISDN) adapter.

20. The server apparatus of claim 17 wherein the client information includes a phone number of the first client apparatus on said switched network.

21. The server apparatus of claim 17 wherein the client information is used to determine a phone number of the first client apparatus on said switched network.

22. The server apparatus of claim 21 wherein the client information includes a login and password.

23. The server apparatus of claim 17 wherein the client information includes a client account number which is used to determine a phone number of the first client apparatus on said switched network.

24. A method of operating a client apparatus for connecting to any of a plurality of server apparatuses over the Internet and a switched network, comprising the steps of
initiating, in response to a user request for information, a first connection via a first interface and the Internet to a selected first server apparatus,
communicating information identifying a specific communication service identified by the request, including user information for enabling the first server apparatus to participate in the establishment of a second connection with said client apparatus over said switched network,
receiving a connection request from the first server apparatus via said second interface and the switched network,
responding to the received connection request to complete the second connection between the first server apparatus and the client apparatus to provide the specific communication service requested by the client apparatus, and
receiving information automatically sent to the client apparatus in accordance with the user request, wherein said automatically sent information is received by way of the second connection and at least partially fulfills the request.

25. The method of claim 24 further comprising the steps of
terminating the second connection, and
re-initiating the establishment of the first connection after termination of the first connection.

26. The method of claim 24 wherein the first connection is established with use of a modem.

27. The method of claim 24 wherein the first connection and the second connection are each established with use of a separate modem.

28. The method of claim 24 wherein one modem is used in the sequential establishment of the first connection and the second connection.

29. A method of operating a server apparatus for connecting to any of a plurality of client apparatuses over the Internet and a switched network, comprising the steps of
receiving at a first client apparatus information by way of a connection over the Internet identifying a specific communication service identified in a client service request,
the server apparatus establishing a new connection to the first client apparatus over said switched network using information received with the client service request, and
automatically sending information to the first client apparatus by way of the new switched network connection, wherein said automatically sent information at least partially fulfills the service request.

30. A method of sending information to a client apparatus pursuant to a request by the client apparatus, the method comprising the steps of:
in response to the request by the client apparatus communicated over a packet network, establishing a connection over a switched network to facilitate communication of the information to the client apparatus; and
automatically sending the information to the client apparatus over the established switched network connection, wherein said automatically sent information at least partially fulfills the request for information.

31. The method of claim 30 further comprising the step of sending data packets to the client apparatus with use of the packet network to enable the client apparatus to send the request.

32. The method of claim 30 further comprising the step of receiving information representing a communication number to be used in establishing the switched network connection.

33. The method of claim 32 further comprising the steps of receiving information representing an account against which a charge for information access is billed and initiating the billing of the charge against the account.

34. The method of claim 30 further comprising the step of receiving information for use in determining a communication number to be used in establishing the switched network connection.

35. The method of claim 30 wherein the step of automatically sending the information to the client apparatus over the established switched network connection comprises sending information over a switched network connection between a server and an Internet service provider (ISP), the switched-network connection between the server and the ISP having been established in accordance with the initiating step.

36. The method of claim 30 wherein the switched network connection carries a collect call.

* * * * *